US010430668B2

(12) United States Patent
Ushirosako

(10) Patent No.: US 10,430,668 B2
(45) Date of Patent: Oct. 1, 2019

(54) SITUATION ASCERTAINMENT SYSTEM USING CAMERA PICTURE DATA, CONTROL DEVICE, AND SITUATION ASCERTAINMENT METHOD USING CAMERA PICTURE DATA

(71) Applicant: HITACHI SYSTEMS, LTD., Tokyo (JP)

(72) Inventor: Koichi Ushirosako, Tokyo (JP)

(73) Assignee: HITACHI SYSTEMS, LTD., Tokyo (JP)

( * ) Notice: Subject to any disclaimer, the term of this patent is extended or adjusted under 35 U.S.C. 154(b) by 7 days.

(21) Appl. No.: 15/552,294

(22) PCT Filed: Mar. 4, 2015

(86) PCT No.: PCT/JP2015/056410
§ 371 (c)(1),
(2) Date: Aug. 20, 2017

(87) PCT Pub. No.: WO2016/139785
PCT Pub. Date: Sep. 9, 2016

(65) Prior Publication Data
US 2018/0039840 A1  Feb. 8, 2018

(51) Int. Cl.
*G06K 9/00* (2006.01)
*G06T 7/20* (2017.01)
(Continued)

(52) U.S. Cl.
CPC ............ *G06K 9/00771* (2013.01); *G06T 7/20* (2013.01); *H04N 5/445* (2013.01); *H04N 5/77* (2013.01);
(Continued)

(58) Field of Classification Search
CPC .. G06K 2209/27; G06K 9/00771; G06T 7/20; H04N 21/21805; H04N 5/445;
(Continued)

(56) References Cited

U.S. PATENT DOCUMENTS 7,254,482 B2 * 8/2007 Kawasaki ............. G07C 5/008
340/435
2003/0212567 A1 * 11/2003 Shintani ................ G06Q 99/00
725/105
(Continued)

FOREIGN PATENT DOCUMENTS

JP 2001-251607 A 9/2001
JP 2003-101999 A 4/2003
(Continued)

OTHER PUBLICATIONS

International Search Report for corresponding International Application No. PCT/JP2015/056410, dated Jun. 9, 2015 (with English translation).
(Continued)

*Primary Examiner* — Farzana Hossain
(74) *Attorney, Agent, or Firm* — Renner, Otto, Boisselle & Sklar, LLP

(57) ABSTRACT

According to a situation confirmation system and method in which image data 311 of a surveillance camera is correlated with additional information 212, the additional information 212 related to the image data 311 of a surveillance camera 3 is added to the image data 311, and a portion or all of the additional information is correlated with the image data according to a purpose of use. The image data 311 and the additional information 212 are correlated to enable confirmation of situation, and to realize expansion of range of use of the image data by analyzing the correlation.

6 Claims, 4 Drawing Sheets

(51) Int. Cl.
    *H04N 5/445* (2011.01)
    *H04N 7/18* (2006.01)
    *H04N 5/77* (2006.01)
    *H04N 7/085* (2006.01)
    *H04N 21/218* (2011.01)

(52) U.S. Cl.
    CPC ............. *H04N 7/085* (2013.01); *H04N 7/181* (2013.01); *H04N 7/183* (2013.01); *H04N 7/188* (2013.01); *H04N 21/21805* (2013.01); *G06K 2209/27* (2013.01)

(58) Field of Classification Search
    CPC .......... H04N 5/77; H04N 7/085; H04N 7/181; H04N 7/183; H04N 7/188
    USPC ......................................................... 348/143
    See application file for complete search history.

(56) References Cited

U.S. PATENT DOCUMENTS

| | | | | |
|---|---|---|---|---|
| 2007/0206834 | A1* | 9/2007 | Shinkai | H04N 7/181 382/103 |
| 2009/0002157 | A1* | 1/2009 | Donovan | H04N 7/18 340/540 |
| 2013/0108234 | A1 | 5/2013 | Ishihara et al. | |
| 2014/0169756 | A1 | 6/2014 | Ishihara et al. | |
| 2014/0333775 | A1 | 11/2014 | Naikal et al. | |

FOREIGN PATENT DOCUMENTS

| | | |
|---|---|---|
| JP | 2003-125382 A | 4/2003 |
| JP | 2003-188950 A | 7/2003 |
| JP | 2008-182456 A | 8/2008 |
| JP | 2013-016911 A | 6/2011 |
| JP | 2013-009256 A | 1/2013 |
| JP | 2013-098657 A | 5/2013 |
| WO | WO 2011/078074 A | 6/2011 |

OTHER PUBLICATIONS

Notification of Reasons for Refusal dated Nov. 8, 2016, issued in counterpart Japanese Patent Application No. 2015-545583 (with English translation).

Decision of Refusal dated Jul. 11, 2017, issued in counterpart Japanese Patent Application No. 2015-545583 (with English translation).

* cited by examiner

SITUATION ASCERTAINMENT SYSTEM USING CAMERA PICTURE DATA, CONTROL DEVICE, AND SITUATION ASCERTAINMENT METHOD USING CAMERA PICTURE DATA

TECHNICAL FIELD

The present invention relates to a situation confirmation system using camera image data, control device, and situation confirmation method using camera image data.

In further detail, the present invention relates to a system, control device and method capable of enabling situation confirmation using camera image data by adding information associated to camera image data, and correlating the relevant camera image data and the relevant additional information.

BACKGROUND ART

Conventionally, a monitoring system exists where images from a camera are shown on a display or the like to allow visual confirmation of the images, or where situation of people and things are recognized through on/off of external input devices such as movement detector, line-pass sensor, motion sensor and the like, for preventing crimes or monitoring safety.

For example, Patent Literature 1 discloses a camera monitoring system which adds recording date and time, name of camera (local installation location), IP address, and alarm information within the camera (such as detection of movement, ON/OFF of external contact, and the like). However, such system for visually confirming an image and monitoring the movement of people and things is effective from the viewpoint of preventing crime and monitoring safety, but it was difficult to utilize the image data in other fields of art.

Therefore, the present invention aims at providing a technique of enabling confirmation of situation by correlating image data from surveillance cameras and additional information, to allow use of image data through purpose-related analysis for purposes other than preventing crime and monitoring safety, by providing necessary images (for monitoring) and expanding the range of use of the image data.

For example, by adding information (additional information) to the image data for distinguishing when, where and what type of scene has been recorded by the surveillance camera, and correlating the image data with a portion of the additional information according to the purpose of use of the image data, the present invention aims at providing a situation confirmation system, a control device and a situation confirmation method using camera image data, where the surveillance camera image data and the additional information are correlated, that can be used not only for preventing crime and monitoring safety, but also for use in fields such as marketing, traffic, amusement, tourism, events, medical service, care giving and so on.

CITATION LIST

Patent Literature

[PTL 1] Japanese Patent Application Laid-Open No. 2013-16911

SUMMARY OF INVENTION

Technical Problem

In order to solve the problems mentioned above, a typical example of a situation confirmation system and method of the present invention in which a surveillance camera image data and additional information are correlated involves adding information related to a relevant image data to the image data of the surveillance camera, and correlating either a portion or all of the additional information to the image data according to purpose of use, and to enable search of the image data.

Solution to Problem

For example, a situation confirmation system using a camera image data according to the present invention comprises:
an image data unit receiving image data from a camera;
a unit setting a header information to a header of the image data;
an image analyzing unit analyzing the image data;
an information receiving unit receiving information entered from an other different system that differs from said camera and/or an information processing device;
an additional information creating unit receiving said information and creating additional information to be added to the image data;
an image storage unit storing the image data including the additional information; and
an image data searching unit searching image data of the image storage unit and displaying the same on a display;
the additional information composed of one or more of the following respective information: an installation location information of the camera, an installation category, a group information, an other system information, a vicinity event information, a fire information, and an auxiliary information; and
the image data of the camera is correlated with additional information of the other systems and/or the information processing device and stored in an image recording device.

Further, a control device of the present invention includes an image storage control device storing a camera image data having correlated a camera image data with an additional information of a surveillance camera system in an image storage device, and an image search control device receiving a search condition from the image search control device, searching image data of the relevant image storage device and outputting the image data;
the image storage control device comprising:
an image data unit receiving image data from a camera;
a unit setting a header information to a header of the image data;
an image analyzing unit analyzing the image data;
an information receiving unit receiving information entered from an other system that differs from said camera and/or an information processing device;
an additional information creating unit receiving said information and creating additional information to be added to the image data; and
an image storage unit storing the image data including the additional information,
wherein the image search control device comprises an image data searching unit searching image data of the image storage means and displaying the image data on a display, the additional information is composed of one or more of the following respective information: an installation location information of the camera, an installation category information, a group information, an other system information, a vicinity event information, a fire information, and an auxiliary information, and the image data of the camera is correlated with additional information of the other systems and/or the information processing device and stored in an image recording device.

Moreover, the present invention provides a situation confirmation method using a camera image data having correlated a camera image data with an additional information of a surveillance camera system having an image storage control device, an image search control device and an image storage device:

the image storage control device executing the following steps of:

an image data step of receiving image data from a camera;

a step of setting a header information to a header of the image data;

an image analyzing step of analyzing the image data;

an information receiving step of receiving information entered from an other system that differs from said camera and/or an information processing device;

an additional information creating step of receiving said information and creating additional information to be added to the image data; and an image storage step of storing the image data including the additional information to the image storage device;

wherein the image search control device executes an image data searching step of searching image data of the image storage means and displaying the image data on a display, the additional information is composed of one or more of the following respective information: an installation location information of the camera, an installation category information, a group information, an other system information, a vicinity event information, a fire information, and an auxiliary information, and the image data of the camera is correlated with additional information of the other systems and/or the information processing device and stored in the image recording device.

Advantageous Effects of Invention

According to the present invention, the image data can be utilized not only for preventing crime and monitoring safety, but also for other purposes of use, such as marketing, traffic (traffic congestion), amusement, tourism, events, medical service, care giving and so on.

The problems, configurations and effects other than those described above will become clear by the following description of the embodiments.

DESCRIPTION OF EMBODIMENTS

Now, the preferred embodiments of the present invention will be described. The present embodiment illustrates a surveillance camera system and method related thereto as a situation confirmation system and method using camera image data having correlated the camera image data with additional information.

The surveillance camera system of the present invention enables to search and display information for specifying an installation location of a camera and a camera image matching a plurality of conditions from an enormous amount of image big data, and enables the desired image to be monitored. Therefore, the present invention provides a system to correlate the camera image with a plurality of additional information compiled into a database (DB), and to enable search thereof. The basic elements are, for example, as follows.

(1) Surveillance camera images (recorded images and real-time images/live images)

(2) Installation locations/areas/groups of the surveillance cameras, and installation category (3) States at the time of recording, such as time zone (morning, noon, evening, night), season, brightness, weather, and flow/retention of people and things (4) Vicinity event information (time range, location, scale of event)

(5) Conditions of disaster and accidents in the vicinity . . . take in from other systems.

Here, the installation category mentioned in (2) should be categorized according to the monitoring target and amount of traffic or density, such as whether pedestrian traffic is relatively heavy or light, whether there is a large number of animals, and whether traffic density is high or low, and in addition, it is preferable to categorize whether it is indoors or outdoors.

Indoors refer, for example, to living rooms or other rooms, passages, elevators, escalators or stairs, entrances, halls, event spaces, machine rooms (including electric rooms and communication/MDF rooms), (indoor) amusement facilities, consultation rooms/operation rooms, warehouses (including refrigerators/freezers), assembly halls, factories, stores, station premises, airports, bus/ferry terminals, public facilities, and (indoor) livestock production facilities (such as hog farms and cowsheds).

Outdoors refers for example to areas inside a given site, areas outside a given site, rooftops, escalators and stairs, farmlands (fields), hog farms, event sites, woods, parks, roads, railroads, airport runways, railroad crossings, intersections, sidewalks, (outdoor) amusement facilities, tunnels, rivers, lakes, ponds, seas and so on.

Embodiment 1

Figure 1:
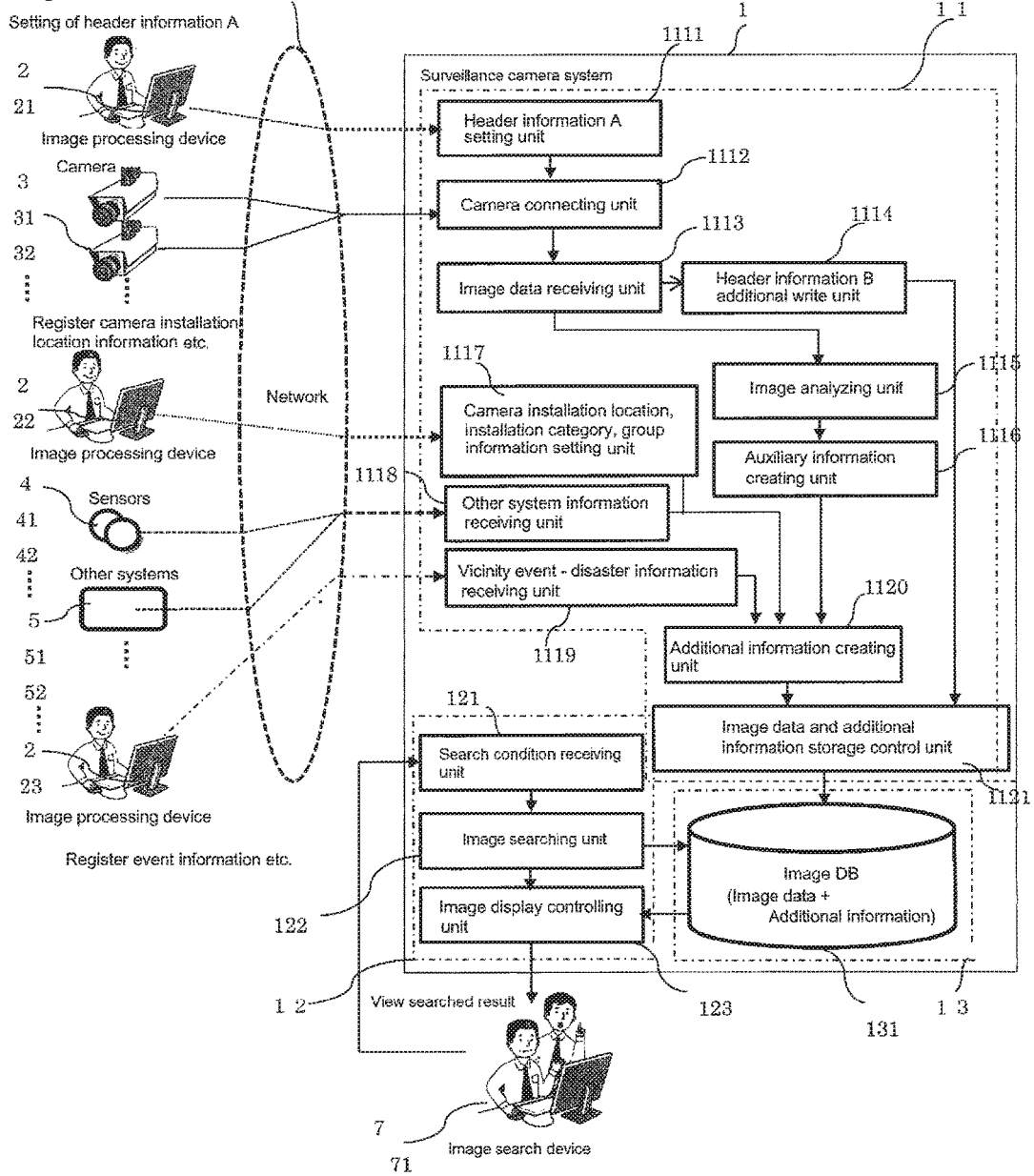
FIG. 1 is a block diagram showing a configuration of a surveillance camera system of a present invention including cameras, various sensors, other systems and an image recording device.

Now, a preferred embodiment of the present invention will be described with reference to the drawings. FIG. 1 is a functional block diagram showing a system configuration illustrating an example where a situation confirmation system using a camera image data in which an image data from a camera is correlated with additional information is applied to a surveillance camera system 1 of the present invention.

At first, the system configuration will be described. The surveillance camera system 1 is connected via a network 6, for example, to cameras 3 (a plurality of cameras 31, 32 and so on), an information processing device 2 (21) for entering a header information A to be provided to a header of a monitor image data (hereinafter referred to image data) from a surveillance camera 3, for example, an information processing device 2 (22) for registering installation location information showing the installation location of the camera 3, various sensors 4 (various types of sensors 41, 42 and so on) providing information of other systems, other systems 5 (51, 52 and so on), and an information processing device 2 (23) for providing vicinity event information and disaster information. Further, the surveillance camera system 1 is connected to an information search device 7 (71) for searching the image data of the camera 3 and displaying the searched results.

The surveillance camera system 1 is composed of a server including a CPU, for example, and the server includes an image storage control device 11, an image search control device 12, and an image storage device 13.

The image storage control device 11 generates information to be added to the image data and the like based on the data and information from the cameras 3, the respective information processing devices 2, various sensors 4, and other systems 5, and performs operation control to register image data including the relevant additional information and header information to the image storage device 13. The additional information should be formed as a plurality of databases (DB).

In other words, the image storage control device 11 has a function to receive information entered through the network 6, such as image data from the cameras 3 (31, 32 and so on), header information A from the information processing device 2 (21), information of other systems from the various sensors 4 and other systems, information on the installation location of the camera from the information processing device 2 (22), event information from the information processing device 2 (23) and the like, and then to add the desired additional information to the relevant image data, and accumulate the same in the image storage device 13.

Figure 3:
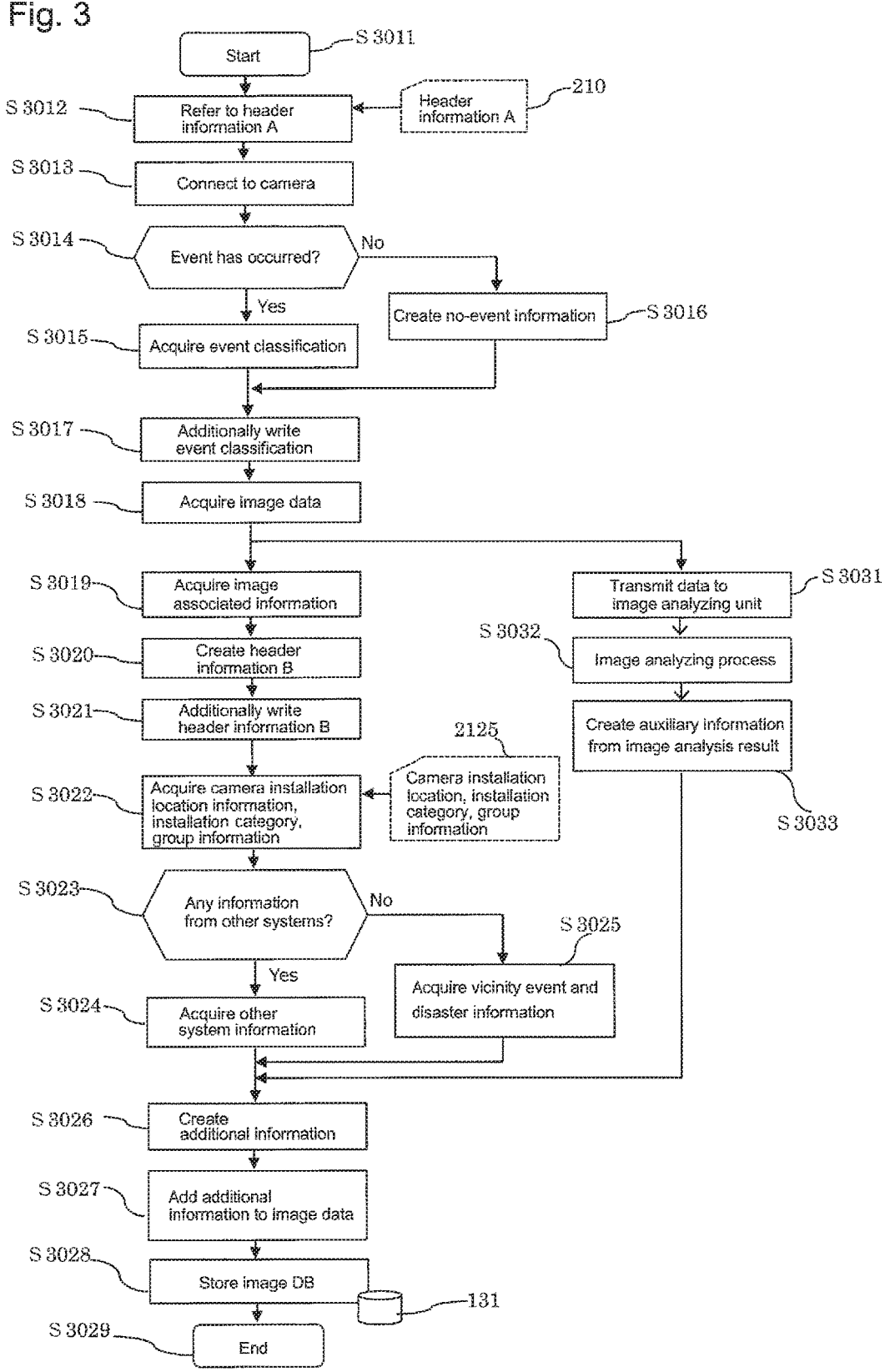
FIG. 3 is a flowchart showing an example of a storage process by an image storage device of FIG. 1 to an image database (image DB).

In order to realize the above function, the image storage control device 11 includes, for example, a header information A setting unit 1111, a camera connecting unit 1112, an image data receiving unit 1113, a header information B additional write unit 1114, an image analyzing unit 1115, an auxiliary information creating unit 1116, a camera installation location—installation category—group information setting unit 1117, an other system information receiving unit 1118, a vicinity event—disaster information receiving unit 1119, an additional information creating unit 1120, and an image data and additional information storage unit 1121, and performs control of the operation of the respective units according to an internally stored program (refer to FIG. 3).

Further, the image search control device 12 has a function to search an image based on a search condition from the information search device 7 (71), and to display the image on a display of the information search device 7 (71).

The image search control device 12 and the image storage control device 11 can be configured of a CPU serving as both devices.

Figure 4:
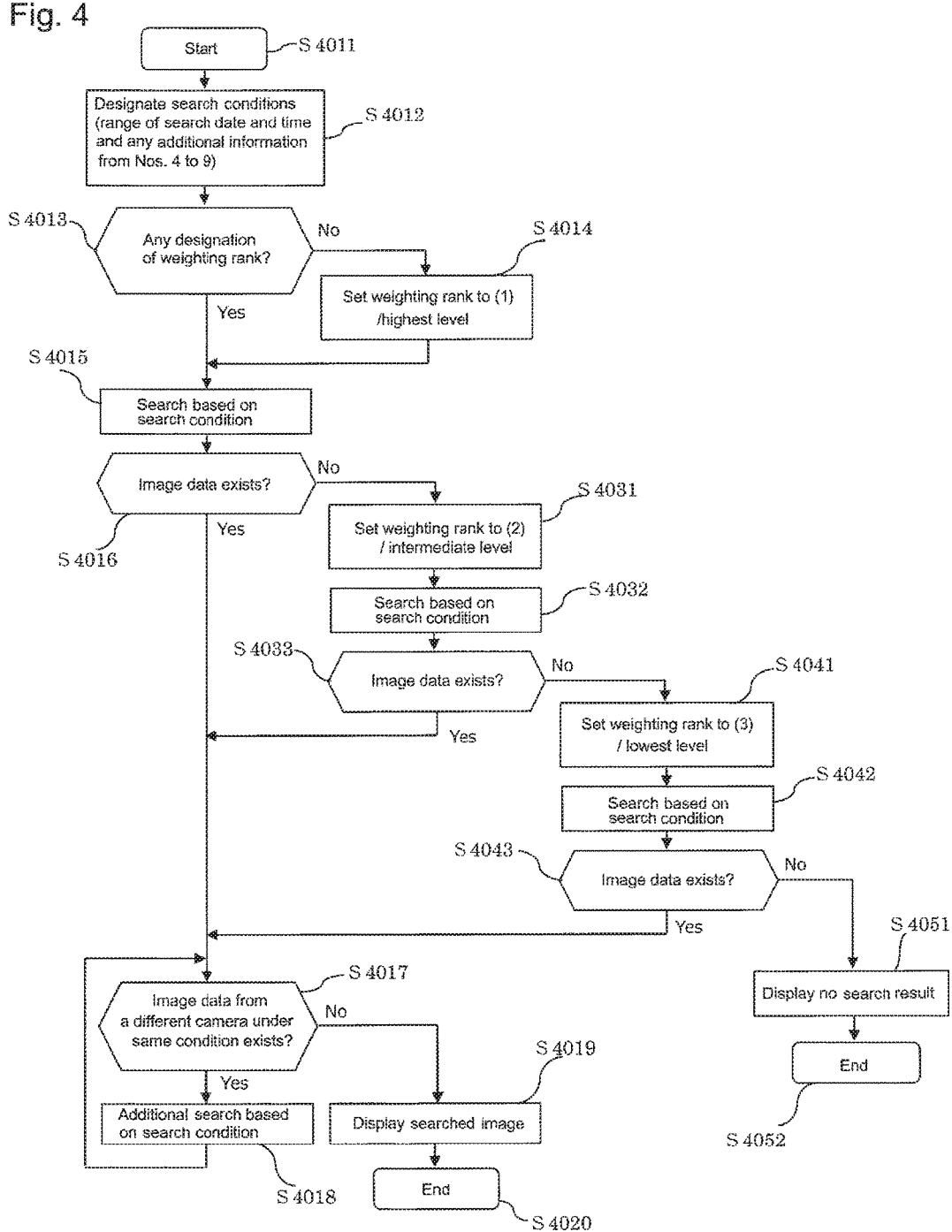
FIG. 4 is a flowchart showing an example of a process for searching and viewing an image from an image DB shown in FIG. 2.

Further, the image search control device 12 includes, for example, a search condition receiving unit 121, an image searching unit 122 and an image display controlling unit 123, and controls the operations of the respective units according to the internally stored program (refer to FIG. 4).

The image storage device 13 has an image DB 131.

The cameras 3 include a plurality of surveillance cameras 31, 32 and so on, for example. The information processing devices 2 (21, 22 and 23) and the information search device 7 (71) are configured, for example, of personal computers.

Sensors 4 can be, for example, a temperature sensor, a humidity sensor, a current sensor, a voltage sensor, an acceleration sensor, a water level sensor, a luminance sensor, an acoustic sensor, an infrared sensor, a motion sensor (temperature difference sensor), a vibration sensor, a weight sensor, and so on.

Next, we will describe the operations of the respective units of the image storage control device 11 and the image search control device 12.

The header information A setting unit 1111 sets the information entered by the information processing device 2 (21) to a header of image data 311 as header information A (first header information 210).

The camera connecting unit 1112 connects to the cameras 3 (31, 32 and so on) and the present system 1, for example, when the present system is activated.

The image data receiving unit 1113 receives the image data 311 from the cameras 3 (31, 32 and so on), and supplies the data to the header information B additional write unit 1114 and the image analyzing unit 1115.

The header information B additional write unit 1114 adds a header information B (second header information 211) created in the present system side to the image data.

The image analyzing unit 1115 has a function to receive image data from the image data receiving unit 1113 and analyze the image. For example, it performs analysis such as movement detection (change of brightness or change of hue), detection of movement direction (direction in which a target passes a virtual line), and feature detection (distinguishing targets such as human, animals and plants, vehicles, goods, ornaments and so on).

The auxiliary information creating unit 1116 receives the analysis image from the image analyzing unit 1115 and creates an auxiliary information 2126.

The camera installation location—installation category—group information setting unit 1117 sets up a camera installation location information 2121, an installation category information 2122 and a group information 2123 entered from the information processing device 2 (22), and supplies the same to the additional information creating unit 1120.

The other system information receiving unit 1118 receives sensor information from sensors 4 and information of other systems 2124 entered from other systems, and supplies the same to the additional information creating unit 1120.

The vicinity event—disaster information receiving unit 1119 receives information entered from the information processing device 2 (23), such as vicinity event and disaster information 2125 from event systems and disaster information systems, and supplies the same to the additional information creating unit 1120.

The additional information creating unit 1120 receives respective information from the auxiliary information creating unit 1116, the camera installation location—installation category—group information setting unit 1117, the other system information receiving unit 1118 and the vicinity event—disaster information receiving unit 1119, associates the information with image data as additional information 212 to be added to the image data 311, and supplies the data to the image data and an additional information storage control unit 1121.

The additional information 212 is, for example, the installation location information 2121, the installation category information 2122, the group information 2123, the information of other systems 2124, the vicinity event—disaster information 2125, the auxiliary information 2126, and so on.

These information include, specifically, the following type of information.

That is, additional information can be information related to the installation location of the camera, registered information such as the vicinity event information, and information automatically acquired from sensors, such as temperature and illuminance, which are, in further detail, the following information.

(1) Date and time of recording, and whether the date is a weekend or a weekday (2) Recording location (global address, classification of installation location: such as whether the location is an office, a factory, a server room, a public facility, a park, or on the street)

(3) Installation method (height, angle, indoors/outdoors, wall-mounted/ceiling-mounted/placed on a stand/pole-mounted)

(4) Camera classification (visible light/infrared light, resolution, fixed/mobile)

(5) Brightness during recording (6) Weather conditions during recording (weather, temperature, humidity and wind power)

(7) The occurrence of events/festivals/incidents/disasters (man-made disaster or natural disaster) at the vicinity during recording, and the weighting or scale thereof (for example, A represents a nation-wide scale incident involving an unspecified large number of people, B represents a vicinity-scale incident involving an unspecified large number of people, and C represents an incident involving a small number of specified people)

(8) Information on "movement direction and flow or retention of the moving objects" obtained from the camera image The image data and the additional information storage control unit 1121 assigns the header information B (211) from the header information B additional write unit 1114 to the image data 311 including the additional information 212 and the header information A (210), and stores the data in the image DB 131.

The image DB 131 stores the data including the header information A, the header information B, the image data 311 and the additional information 212.

The search condition receiving unit 121 receives the search condition entered from the information search device 7 (71).

The image searching unit 122 searches the image DB 131 based on the search condition from the search condition receiving unit 121.

The image display controlling unit 123 extracts the results of search (including the image data) searched based on the search condition, supplies the result to the display of the information search device 7 (71), and displays the image. At this time, it is also possible to display additional information and the like together with the searched and extracted image. Further, there can be a plurality of images, if the search condition is satisfied. In that case, the image whose weighting rank is higher can be set to be displayed first. The examples of the search conditions are as follows.

SEARCH EXAMPLE

After searching the image based on the following situation, the installation location of the corresponding camera and the recorded image or live image/real-time image are displayed. The number of search condition(s) is one or more, and the AND/OR of the conditions can be designated.

Search Example 1—for Crime Preventing/Safety Monitoring Purposes

Persons passing through XX park from 20:00 of Date, Month to 2:00 the next day

Method for searching search example 1:

1) Extract image data corresponding to "20:00 of Date, Month to 2:00 of Date, Month+1" from recorded date and time of the header information B.

2) Narrow down the above-extracted images to "cameras installed in XX park" based on installation location information. At the same time, find out the number of "cameras installed in XX park".

3) Narrow down the above-extracted images further by extracting image data having "movement of people" as the auxiliary information, and display the narrowed-down image data on the information search device 7 (71).

4) When there are a plurality of "cameras disposed within XX park", step 3) is repeated in the order of camera ID.

Search Example 2—for Traffic and Safety Monitoring Purposes (Such as immediately after a railway accident) Entrance of a currently-crowded station premise Method for searching search example 2:

1) In the information processing device 2 (23), weighting is set either automatically or manually according to the route in which the accident has occurred, the distance from the station where the accident occurred, or the level of influence regarding the "vicinity event, disaster information" of the "camera installed at the entrance of a station premise".

2) The image data up to "five minutes before present date and time" is extracted based on the recorded date and time of the header information B.

3) Narrow down the image of the above-described image data to the "cameras installed at the entrance of the station premise" based on the installation location information. At the same time, check the number of "cameras installed at the entrance of a station premise".

4) If there is a plurality of "cameras installed at the entrance of a station premise", the order of search is set automatically according to the order from those having higher ranks of weight.

5) Narrow down the above-described image data to the image data having "a large number of detected people, and slow movement speed" as auxiliary information, and display the narrowed down image data on the information search device 7 (71).

6) If there are a plurality of "cameras installed at the entrance of a station premise", 3) is repeated based on the above-described order of search.

Search Example 3—for Marketing Purposes

Conditions of passers-by at lunchtime (for example, between 11:30 and 13:30) at a restaurant floor of YY shopping mall on a rainy day in April Method for searching search example 3:

1) Extract image data of "lunchtime (such as between 11:30 and 13:30) in April" from the recorded date and time of the header information B 2) Narrow down the images to "cameras installed on the restaurant floor of "YY shopping mall"

At the same time, the number of "cameras installed on the restaurant floor of YY shopping mall" is checked.

3) Narrow down the above-mentioned image data to image data when "the weather was rainy at lunchtime (such as between 11:30 and 13:30) in April" based on information from other systems, and display the narrowed down image data on the information search device 7 (71).

4) Further, if the detected number of passers-by is included in the auxiliary information, the detected number of passers-by is displayed in addition to the image data.

Search Example 4—for Amusement-Facility Purposes

Conditions in a parking lot during opening hours (such as between 9:00 and 22:00) of amusement park T of days where the weather was cloudy and the maximum temperature was 10 degrees centigrade or lower in February Further, by changing the cloudy day of the search condition to sunny day or rainy day and comparing the data, the conditions of the parking lot depending on the weather can be recognized.

Method for searching search example 4:

1) The weighing rank of February 14 is set to the highest rank regarding "vicinity event, disaster event" of "cameras installed at parking lot of amusement park T" in the information processing device 2 (23).

2) The image data during "opening hours (such as between 9:00 and 22:00) in February" is extracted based on recording date and time of the header information B.

3) The above-described image data is narrowed down to the images from "cameras installed at parking lot of amusement park T" based on the installation location information. At the same time, the number of "cameras installed at parking lot of amusement park T" is checked.

4) The above-mentioned image data is narrowed down to the image data when "it was cloudy during opening hours (such as between 9:00 and 22:00)" based on the information from other systems, and the narrowed-down image data is displayed on the information search device 7 (71).

5) Further, if detected number of cars is included as auxiliary information, the detected number of cars is displayed in addition to the image data.

As described above, by changing the search conditions, the image data according to the purpose of use can be obtained. In other words, the search conditions are changed according to the purpose of use of the images.

Figure 2:
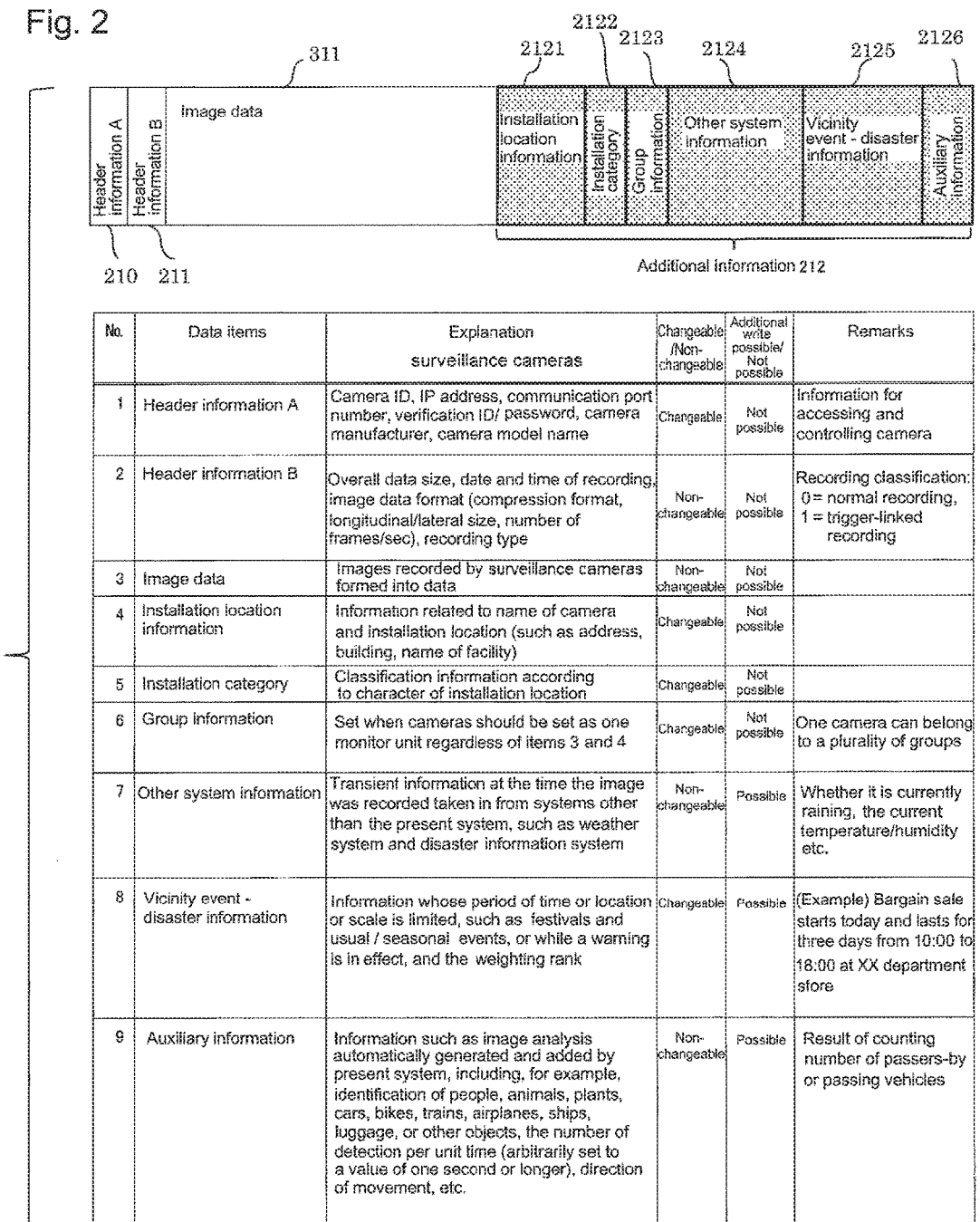
FIG. 2 illustrates an example of a data configuration of a present invention.

FIG. 2 is a configuration diagram showing a data configuration example of the present invention. The data structure is composed of the image data 311 from the camera 3, two header information A and B (210 and 211) assigned to the header of the relevant image data, and the additional information 212 including a plurality of information 2121 through 2126.

The header information A (210) is information for accessing and controlling the cameras 3. For example, the information can be a camera ID, an ID address, a communication port number, an authentication ID/password, name of camera, camera type and so on for identifying the camera 3. This header information A can be changed, but additional write is not possible.

The header information B (211) is prepared at the side of the present system, and it can be, for example, the size of the overall data, the recording date and time, the format of image data (such the compression format, longitudinal/lateral size, number of frames/sec), recording type and so on. The recording type is set to "0" during normal recording, and set to "1" during trigger-linked recording. The header information B cannot be changed, and additional write is not possible.

The image data 311 has formed the image recorded by the cameras 3 (31, 32 and so on) into data. The image data 311 cannot be changed, and additional write is not possible.

The additional information 212 includes an installation location information 2121, an installation category 2122, a group information 2123, an information of other systems 2124, a vicinity event—disaster information 2125, and an auxiliary information 2126.

The installation location information 2121 is information related to the name of the cameras 3 and the installation location (such as the address, building, name of facility and the like). The installation location information can be changed, but additional write is not possible.

The installation category 2122 is classification information corresponding to the character of the installation location. The installation category cannot be changed, and additional write is not possible.

The group information 2123 is set when cameras should be set as one monitor unit regardless of the image data and installation location information. It is possible to have one camera belong to a plurality of groups. The group information can be changed, but additional write is not possible.

The information of other systems 2124 is transient information at the time the image was recorded taken in from systems other than the present system, such as the weather system, the disaster information system and the like, and from the sensor 4. This information can include, for example, whether it is raining currently, the current temperature, humidity, and so on. This information cannot be changed, but additional write is possible.

The vicinity event—disaster information 2125 is information whose period of time or location or scale is limited, such as festivals and usual/seasonal events, or while a warning is in effect, and the weighting rank. One example of this information is that a bargain sale starts today and lasts for three days from 10:00 to 18:00 at XX department store. The vicinity event—disaster information can be changed, and additional write is possible.

The weighting ranks can be classified, for example, as follows. Further, the weighting ranks can be further classified into four or more classifications.

(A) Emergency warning, special precaution (felon in hiding), large-scale event, involving an unspecified large number of people in a wide area (such as the Olympics)

(B) Warning, precaution (light offender in hiding), a middle-scale event, involving an unspecified large number of people in a limited area (C) Precaution, warning (suspect in hiding), small-scale event, involving a small number of people (such as limited to invited guests or members, or locally limited)

The auxiliary information 2126 is information that is automatically generated by the present system, such as image analysis, and added to the data. It can be the number of passers-by or the result of counting the passing vehicles, for example. The auxiliary information cannot be changed, but additional write is possible.

The operation based on the flowchart of FIG. 3 is as follows.

The image storage control device 11 executes the following respective steps.

Step S3011: Start processing operation to store the image data in the image DB 131.

Step S3012: The header information A (210) set by the information processing device 21 and assigned to the header of the image data 311 is referred to.

Step S3013: The present system 1 and the cameras 3 are connected.

Step S3014: It is determined whether an event has occurred or not. If an event has occurred (Yes), the operation advances to step S3015, and in the present step, the event classification entered from the information processing device 23 is acquired. If there is no event (No), the procedure advances to step S3016, and in the present step, a no-event information is created.

Step S3017: An event classification (2125) acquired from the information processing device 23 is additionally written.

Step S3018: The image data 311 of the image recorded by the camera 3 is acquired.

Step S3019: The image associated information related to the image data 311 is acquired.

Step S3020: The header information B (211) is created in response to the reception of the image data 311.

Step S3021: The header information B (211) is added to the header of the image data 311.

Step S3022: The camera installation location information 2121, the installation category 2122 and the group information 2123 entered through the information processing device 22 are acquired.

Step S3023: It is determined whether or not there is information from the sensor 4 or the information processing device 23, that is, information from other systems. If there is information from other systems (Yes), the procedure advances to step S3024, and in the relevant step, the information of other systems 2124 is acquired. If there is no information (No), the procedure advances to step S3025, where the vicinity event information and the disaster information 2125 entered from the information processing device 23 are acquired.

Step S3026: In response to acquiring the above-described respective information, the additional information 212 to be associated and added to the image data 311 is created.

Step S3027: The additional information 212 is added to the image data 311 as additional write.

Step S3028: The image data 311 including the additional information is stored in the image DB 131.

Step S3029: The processing operation to store the image data to the image DB is ended.

Step S3031: The image data acquired in step S3018 is transmitted to the image analyzing unit 1115.

Step S3032: The image analyzing unit 1115 executes a process to analyze the image data.

Step S3033: Based on the result of image analysis of the image data in step S3032, an auxiliary information is created, and the procedure advances to step S3026.

The operation based on the flowchart of FIG. 4 is as follows. The image search control device 12 executes the following respective steps.

Step S4011: The processing operation for searching the image data of the image DB 131 is started.

Step S4012: The search condition designated by the information processing device 24 is received. The search condition is set, for example, by setting the range of search date and time and the additional information 212 (any one of Nos. 4 through 9 in the Table of FIG. 2).

Step S4013: It is determined whether the weighting rank is designated or not. If the rank is designated as a result of the determination, the procedure advances to step S4015, and if not (No), the procedure advances to step S4014.

Step S4015: Execute search based on the search condition.

Step S4014: The weighting rank is set to the highest level (1).

Step S4016: Whether an image data 311 exists or not is determined. As a result of the determination, if there is an image data (Yes), the procedure advances to step S4017, and if not (No), it advances to step S4031.

Step S4031: The weighting rank is set to the intermediate level (2), and the procedure advances to step S4032.

Step S4032: Search is executed based on the search condition, and the procedure advances to step S4033.

Step S4033: Whether image data exists or not is determined. As a result of the determination, if image data exists (Yes), the procedure advances to step S4017, and if not (No), the procedure advances to step S4041.

Step S4041: The weighting rank is set to the lowest level (3), and the procedure advances to step S4042.

Step S4042: Search is executed based on the search condition, and the procedure advances to step S4043.

Step S4043: Whether image data exists or not is determined. As a result of the determination, if the image data exists (Yes), the procedure advances to step S4017, and if not (No), the procedure advances to step S4051.

Step S4017: Whether an image data from a different camera under the same condition exists or not is determined. As a result of the determination, if the image data exists (Yes), the procedure advances to step S4018, and if not (No), the procedure advances to step S4019.

Step S4018: Additional search based on the search condition is performed, and the procedure returns to step S4017.

Step S4019: The searched image is supplied to and displayed on the information processing device 23.

Step S4051: A message stating that there is no searched result is displayed.

Steps S4020 and S4052: The processing operation for searching the image data of the image DB 131 is ended.

According to the above-described embodiment, by adding to the image data the information capable of distinguishing when, where and what type of image has been recorded in the image data taken by the surveillance camera, and correlating a portion of additional information with the image data according to the purpose of use of the image data, it becomes possible to use the image data not only for preventing crime and monitoring safety, but also for use in other fields, such as marketing, traffic, amusement, tourism, events, medical service, care giving and so on.

Further, for example, it becomes possible to recognize new facts and situations by correlating additional information with the image data, such as "there are many passers-by at shopping district XX during the day time on a sunny day with high temperature and high humidity in the summer season", so that "shops should prepare to welcome customers in the morning", or "in facility X, many people move in the wrong direction in the evacuation route during disaster" so that "there is a need to reconsider the evacuation route".

Furthermore, since the range of use of surveillance cameras can be expanded, the introduction of surveillance cameras can be enhanced, and the analysis of images correlated with additional information can be provided as a service.

The present invention is not restricted to the above-illustrated preferred embodiments, and can include various modifications. The above-illustrated embodiments are described in detail to help understand the present invention, and the present invention is not restricted to a structure including all the components illustrated above. Further, a portion of the configuration of an embodiment can be replaced with the configuration of another embodiment, or the configuration of a certain embodiment can be added to the configuration of another embodiment. Moreover, a portion of the configuration of each embodiment can be added to, deleted from or replaced with other configurations. Further, the configurations and functions illustrated above can be realized via software by the processor interpreting and executing programs realizing the respective functions. The information such as the programs, tables and files for realizing the respective functions can be stored in a storage device such as a memory, a hard disk or an SSD (Solid State Drive), or in a memory media such as an IC card, an SD card or a DVD.

REFERENCE SIGNS LIST

1: Surveillance camera system
11: Control unit (image storage control unit)
1111: Header information A setting unit
1112: Camera connecting unit
1113: Image data receiving unit
1114: Header information B additional write unit
1115: Image analysis unit
1116: Auxiliary information creating unit
1117: Information setting unit (camera installation location information—installation category—group setting unit)
1118: Other system information receiving unit
1119: Vicinity event—disaster information receiving unit
1120: Additional information creating unit
1121: Image data and additional information storage control unit
12: Control device (image search control device)
121: Search situation receiving unit
122: Image searching unit (search engine)
123: Image display control unit
13: Image storage device (image recording device)
131: Image DB

The invention claimed is:

1. A situation confirmation system for using camera image data that enables an image data from a camera to be applied for a purpose of use in addition to preventing crime or monitoring safety, the situation confirmation system comprising
   a central processing unit receive image data from a camera via a network
   set header information to a header of the image data;
   analyze the image data to identify objects and movement;
   receive respective information entered from another system excluding the camera and/or an information processing device via the network;
   automatically create, in response to the analyzing of the image data, auxiliary information that includes a number of objects and a direction of movement based on the created auxiliary information and the respective information,
   create and add to the image data additional information according to a purpose of use of the image data by correlating the image data with a portion of additional information according to the purpose of use of the image data; wherein:
   the additional information includes:
   information of an installation location of the camera entered from the information processing device;
   a vicinity event and disaster information entered from the information processing device; and
   the auxiliary information; and the vicinity event and disaster information includes a set of weighting ranks;
   the purpose of use of the image data comprises marketing, traffic, amusement, sightseeing, festival, event, medical service and care giving;
   store the image data including the additional information; and
   the purpose of use of the image data of the camera in addition to crime prevention or safety monitoring, and stored in an image recording device;
   search image data and display the same on a display
   receiving a search condition;
   searching the image data correlated with the portion of the additional information;
   extract a search result based on the search condition; and
   based on the search result, set a weighting rank according to the vicinity event and disaster information, the weighting rank indicating a level of influence
   wherein the image data is correlated with the portion of the additional information of the other system and/or the information processing device according to the purpose of use of the image data of the camera in addition to crime prevention or safety monitoring and stored in an image recording device.

2. The situation confirmation system using camera image data according to claim 1, wherein
   the auxiliary information includes one or more of the following information of identification and detection of human, animals, plants, vehicles, bicycles, trains, airplanes, ships, luggage or other objects, and a number of detection and a direction of movement per unit time of the identified and detected object.

3. The situation confirmation system using camera image data according to claim 1, wherein the header information is composed of header information A capable of being set by the information processing device, and a header information B created within the situation confirmation system.

4. The situation confirmation system of claim 1, wherein the central processing unit is further configured to:
   receive a modifiable search condition including an identifier of a particular camera;
   determine whether or not there is a designation of a weighting rank in the vicinity event and disaster information;
   when there is no designation of a weighting rank, set a weighting rank to a higher level;
   when there is designation of the weighting rank and a weighting rank was set to a higher level, perform a first search for image data according to the search condition;
   determine whether or not there is image data as a result of the first search for image data;
   when there is no image data as a result of the search, set the weighting rank to a lower level and perform a second search for image data according to the search condition;
   determine whether or not there is image data as a result of the second search;
   when there is image data as a result of the first search or the second search, determine whether or not there is image data with a condition identical to the search condition from another camera;
   when image data exists with a condition identical to the search condition from another camera, perform an additional search of the image data according to the search condition;
   when there is no image data from another camera different from the same camera with the same condition, display on a display the image data resulting from the first search and the second search; and modify the search condition according to the purpose of use of the image data and obtain image data according to the purpose of use; and when there is image data from another camera with the same condition, prioritize image data having a higher weighting rank with a higher level and display such image data first.

5. A control device comprising:
an image storage control device configured to store camera image data that correlates camera image data with additional information in a surveillance camera system of the image storage device, the image storage control device comprising:
  a central processing unit configured to:
    receive image data from a camera via a network;
    set a header information to a header of the image data;
    analyze the image data to identify objects and movement;
    receive information entered from another system excluding the camera and/or an information processing device via a network;
    automatically create, in response to the analyzing of the image data, auxiliary information that includes a number of objects and a direction of movement of the objects;
    based on the created auxiliary information and the respective information create and add to the image data additional information according to a purpose of use of the image data by correlating the image data with a portion of additional information according to the purpose of use of the image data, wherein:
      the additional information includes:
        information of an installation location of the camera entered from the information processing device;
        another system information entered from the another system and/or a vicinity event and disaster information entered from the information processing device; and
        the auxiliary information;
      the vicinity event and disaster information includes a set of weighting ranks;
      the purpose of use of the image data comprises marketing, traffic, amusement, sightseeing, festival, event, medical service and care giving; and
    store the image data including the additional information,
an image search control device configured to search image data of the image storage and display the image data on a display, comprising:
  receiving a search condition from the image search control device;
  search the image data of the image search control storage device correlated with the portion of the addition information;
  extract a search result based on the search condition;
  based on the search result, set a weighting rank according to the vicinity event and disaster information, the weighting rank indicating a level of influence regarding a vicinity event or disaster information;
wherein the image data is correlated with a portion of the additional information of the another system and/or the information processing device according to a purpose of use of the image data of the camera in addition to crime prevention or safety monitoring.

6. A situation confirmation method using a camera image data having correlated a camera image data with an additional information in a surveillance camera system comprising an image storage control device, an image search control device and an image storage device,
the image storage control device configured to cause a central processing unit to:
  receive image data from a camera via a network;
  set a header information to a header of the image data;
  analyze the image data to identify objects and movement;
  receive respective information entered from another system excluding the camera and/or an information processing device via a network;
  automatically create, in response to the image analysis, an auxiliary information including a number of objects and a movement of the objects;
  based on the created auxiliary information and the respective information, create and add to the image data additional information according to a purpose of use of the image data by correlating the image data with a portion of additional information according to the purpose of use of the image data by correlating the image data with a portion of additional information according to the purpose of use of the image data, wherein:
    the additional information includes:
      information of an installation location of the camera entered from the information processing device;
      another system information entered from the another system and/or a vicinity event and disaster information entered from the information processing device; and
      the auxiliary information; and
    the vicinity event and disaster information includes a set of weighting ranks;
    the purpose of use of the image data comprises marketing, traffic, amusement, sightseeing, festival, event, medical service and care giving; and
  storing the image data including the additional information,
  search image data and display the image data on a display, comprising:
    receiving a search condition;
    searching the image data correlated with the portion of the additional information;
    extract a search result based on the search condition; and
    based on the search result, set a weighting rank according to the vicinity event and disaster information, the weighting rank indicating a level of influence regarding a vicinity event or disaster information;
  wherein the image data is correlated with the portion of the additional information of the another system and/or the information processing device according to the purpose of use of the image data of the camera in additional to crime prevention or safety monitoring.

* * * * *